(12) United States Patent
Hathaway et al.

(10) Patent No.: US 11,317,744 B2
(45) Date of Patent: May 3, 2022

(54) UNIVERSAL BRACKET MOUNT FOR RAILINGS AND FENCES

(71) Applicants: Glenn T Hathaway, Attleboro, MA (US); Nick Scott Hathaway, Attleboro, MA (US); Laura Louise Hathaway, Attleboro, MA (US)

(72) Inventors: Glenn T Hathaway, Attleboro, MA (US); Nick Scott Hathaway, Attleboro, MA (US); Laura Louise Hathaway, Attleboro, MA (US)

( * ) Notice: Subject to any disclaimer, the term of this patent is extended or adjusted under 35 U.S.C. 154(b) by 510 days.

(21) Appl. No.: 15/622,074

(22) Filed: Jun. 13, 2017

(65) Prior Publication Data

US 2018/0125270 A1    May 10, 2018

Related U.S. Application Data

(60) Provisional application No. 62/349,854, filed on Jun. 14, 2016.

(51) Int. Cl.
| | |
|---|---|
| *A47G 7/04* | (2006.01) |
| *F16M 13/02* | (2006.01) |
| *A47B 96/06* | (2006.01) |
| *G09F 7/18* | (2006.01) |
| *A01K 31/14* | (2006.01) |
| *A01K 5/01* | (2006.01) |
| *A01G 25/00* | (2006.01) |
| *A01G 9/02* | (2018.01) |

(52) U.S. Cl.
CPC .............. *A47G 7/045* (2013.01); *A47B 96/06* (2013.01); *A47G 7/044* (2013.01); *F16M 13/022* (2013.01); *G09F 7/18* (2013.01); *A01G 9/02* (2013.01); *A01G 25/00* (2013.01); *A01K 5/0114* (2013.01); *A01K 31/14* (2013.01); *A47B 2220/0038* (2013.01); *G09F 2007/1856* (2013.01)

(58) Field of Classification Search
CPC .......... A47B 96/06; A01G 9/02; A01G 9/024; A47G 7/045
USPC .......................................... 211/90.2; 248/235
See application file for complete search history.

(56) References Cited

U.S. PATENT DOCUMENTS 2,859,879 A * 11/1958 Rogers ................. A47B 96/027
                                                    211/90.01
3,034,758 A *  5/1962 Vagi ....................... A47H 1/142
                                                       248/251

(Continued)

FOREIGN PATENT DOCUMENTS

CA         2468533 A1 * 11/2005 ............. F16M 11/18

OTHER PUBLICATIONS

Mintcraft flower box bracket, Aug. 28, 2013, retreived from https://www.amazon.com/MINTCRAFT-GB0043-Flower-Bracket-2-Pack/dp/B003MZY4CU/ref=sr_1_1?keywords=Mintcraft+GB0043+Flower+Box+Bracket&qid=1579630400&sr=8-1[Jan. 21, 2020 1:20:38 PM].*

*Primary Examiner* — Monica L Barlow
*Assistant Examiner* — Aaron M Rodziwicz
(74) *Attorney, Agent, or Firm* — Alan F. Feeney; Daniel W. Sullivan (57) ABSTRACT

A mounting bracket having more desirable utility as compared to known embodiments includes a first flat surface for mounting to a box, shelf, or structure, and a second curved surface for mounting to the header of a railing or fence. The bracket can mount to multiple boxes, shelves, and structures, and does not require tools for installation to the railing or fence.

20 Claims, 8 Drawing Sheets

(56) References Cited

U.S. PATENT DOCUMENTS

| | | | | |
|---|---|---|---|---|
| 3,191,219 | A * | 6/1965 | Vagi | F16B 12/20 16/257 |
| 3,669,395 | A * | 6/1972 | Gehrke | A47F 5/08 248/235 |
| 4,417,712 | A * | 11/1983 | DeHart | G09F 7/18 248/220.22 |
| D315,862 | S * | 4/1991 | Specker, Jr. | D8/373 |
| 5,460,279 | A * | 10/1995 | Emery | A47B 55/02 211/106 |
| 5,487,517 | A * | 1/1996 | Smith | A47G 7/044 248/215 |
| 5,531,416 | A * | 7/1996 | Remmers | A47B 61/003 211/105.1 |
| 5,582,303 | A * | 12/1996 | Sloan | A47G 25/0692 211/105.1 |
| 6,227,506 | B1 * | 5/2001 | Benedict | A47B 96/06 211/90.01 |
| 7,024,816 | B1 * | 4/2006 | Marks | A47G 7/044 47/39 |
| D605,932 | S * | 12/2009 | Piersant | D8/381 |
| D811,205 | S * | 2/2018 | Hanley | D8/380 |
| D813,022 | S * | 3/2018 | Hanley | A47H 1/142 D8/380 |
| 10,070,723 | B1 * | 9/2018 | Garrity | A47B 95/008 |
| 2003/0052073 | A1 * | 3/2003 | Dix | A47B 57/48 211/90.02 |
| 2004/0238702 | A1 * | 12/2004 | Britten | A47B 96/06 248/227.1 |
| 2006/0201060 | A1 * | 9/2006 | Warman | A47G 7/045 47/65.5 |
| 2006/0231516 | A1 * | 10/2006 | Moore | A47B 61/003 211/85.3 |
| 2007/0131832 | A1 * | 6/2007 | Adams | A47G 7/045 248/227.4 |
| 2009/0224118 | A1 * | 9/2009 | Meyers | A47B 96/06 248/215 |
| 2012/0132766 | A1 * | 5/2012 | Fowler | A47G 7/045 248/201 |
| 2014/0231606 | A1 * | 8/2014 | Sobb | A47F 5/0823 248/224.8 |
| 2015/0300562 | A1 * | 10/2015 | Gillen | A47G 7/047 248/219.3 |
| 2017/0231173 | A1 * | 8/2017 | Bryant | A01G 9/024 47/66.7 |
| 2018/0125270 | A1 * | 5/2018 | Hathaway | A47G 7/044 |

\* cited by examiner

UNIVERSAL BRACKET MOUNT FOR RAILINGS AND FENCES

CROSS-REFERENCE TO RELATED APPLICATIONS

The present application claims priority from Provisional Patent Application No. 62/349,854, filed on Jun. 14, 2016, the disclosure of which is relied upon and incorporated herein by reference.

FIELD OF THE INVENTION

The present invention relates to a metal, composite, or plastic bracket comprised of a flat mounting surface to a wooden or metal box, shelf, or structure, and a curved surface for mounting to the cross header of a railing or fence, or directly to lattice. The curved surface for mounting to the header allows very rapid installation to the railing or fence without the use of tools.

BACKGROUND OF THE INVENTION

Historically, the mounting of flower boxes or other structures to a railing or fence have been problematic, time consuming and cumbersome. The vast majority of mounts for railings have multiple components whose dimensions must be adjusted to the shape and size of the header for mounting. Furthermore, the complexity of these brackets increase their cost to the consumer, and the time required for mounting to the railing is longer than desired. In most cases, tools are required to secure the multiple components to each other. To address this issue, commercially available flower boxes are made or molded with a saddle for mounting around a standard size header. However, this solution has several disadvantages. First, the saddle size must correspond closely to the size of the header to prevent the box from tipping or falling off the railing. Second, even when the dimension of the header is compatible with the size of the saddle mount, the box is not fully secure on the railing, and it is possible to knock the flower box off the railing. Finally, the aesthetics of a saddle mount are less than desirable.

There are little or no commercial solutions for mounting of flower boxes or other structures to lattices, chain-link fences, or to wrought iron railings and fences. Most commercially available brackets have no incorporated solution for mounting to the metal header.

It desirable in the marketplace to develop an elegant, low cost mounting solution to railings and fences, which is universal to multiple configurations. The solution should allow an efficient and secure mounting process, with the strength required to support the structure being mounted.

The term "header" refers to the horizontal cross support of fence or railing, which are comprised of plastic, composite, wooden, or metal with a square, rectangular, trapezoidal, round, or profiled shape.

The terms "balustrade", "bannister", "support", "column", or "post" refer to the multiple vertical supports of fence or railing, which are comprised of plastic, composite, wooden, or metal with a square, rectangular, trapezoidal, round, or profiled shape. Typically, the fence or railing contains multiple supports at fixed intervals.

SUMMARY OF THE INVENTION

A curved mounting bracket is described herein having improved properties over known embodiments. The bracket includes at least a first flat surface for mounting to a box, shelf, or other structure and a second curved surface for universal mounting to multiple configurations of railings or fences comprised of a header and supports spaced at fixed intervals.

More specifically, the mounting bracket is comprised of plastic, composite, or metal alloys, with sufficient strength to support a box, shelf, or other structure. The mounting bracket includes a first flat mounting surface to a box, shelf, or other structure, and a second curved surface for universal mounting to multiple configurations of railings or fences comprised of a header and supports spaced at fixed intervals, wherein the opposite side of the first surface lies in the spaced intervals between the vertical supports of the railing or fences, and the vertical surface of the box, shelf, or structure, which mates with the first mounting surface of the bracket, lies directly against the vertical supports of the railing or fences.

Thus, the present invention encompasses a mounting bracket comprised of a plastic, composite, or metal structure, with sufficient strength to support a box, shelf, or other structure, including their contents with a first flat mounting surface to a box, shelf, or structure and a second curved surface for universal mounting to multiple configurations of railings or fences comprised of a header and supports spaced at fixed intervals, wherein the opposite side of the first surface lies in the spaced intervals between the vertical supports of the railing or fences, and the vertical surface of the box, shelf, or structure, which mates with the first mounting surface of the bracket, lies directly against the vertical supports of the railing or fences.

These and other aspects of the invention can be realized from a reading and understanding of the detailed description and drawings.

DETAILED DESCRIPTION OF THE INVENTION

Figure 1:
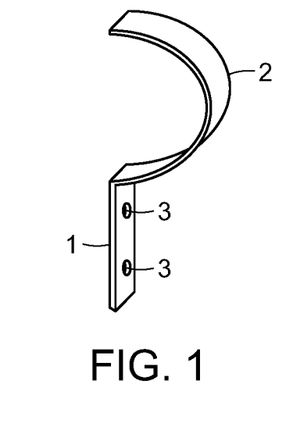
FIG. 1 is the mounting bracket with a first flat surface for mounting to a box, shelf, or support, and a second curved surface for universal mounting to multiple configurations of railings, fences, or lattices.
Figure 2:
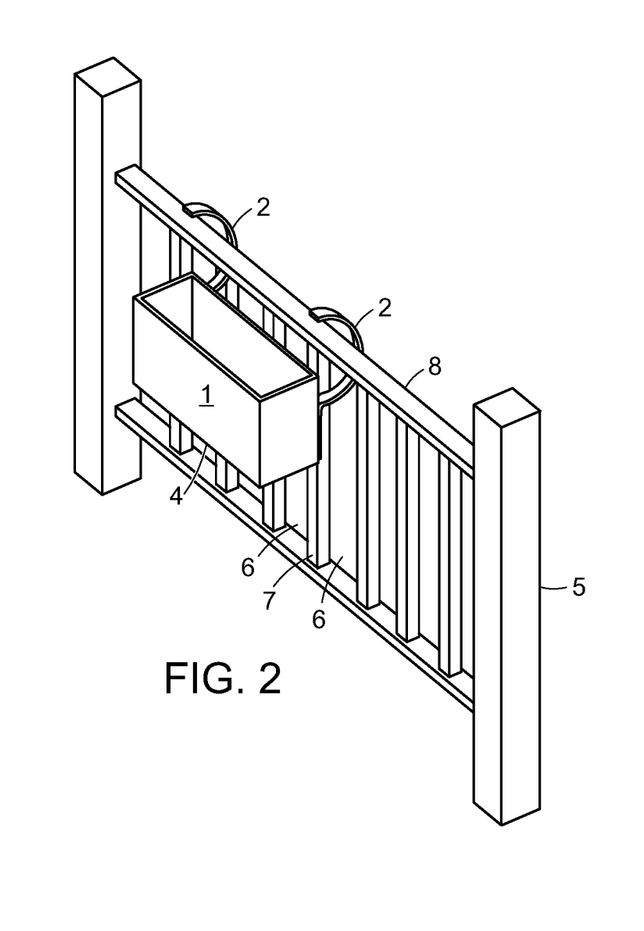
FIG. 2 is the mounting of the curved surface to a typical fence or railing with balustrade supports.
Figure 2A:
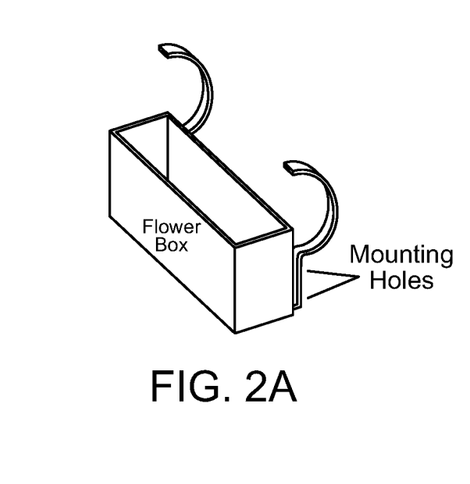

The invention provides a unique way to install flower boxes, shelves and other objects to fences of all types as well as decks, railings, lattices and other building/residential fixtures both indoors and outdoors. FIG. 1 depicts one embodiment of the claimed mounting bracket having a first flat surface 1 for mounting to a box, shelf, or structure, and a second curved surface 2 for universal mounting to multiple configurations of railings, fences, or lattices. The bracket FIG. 1 further comprises means 3 in which to secure said bracket to the mounted object. In the preferred embodiment, the first flat surface has one or more holes 3 bored into it into which a traditional screw, nail or bolt may be inserted through said hole and into the side of the mounted object thereby securing the bracket FIG. 1 to the object. As depicted in FIG. 2, when the bracket FIG. 1 is affixed to the back wall of a mounted object, in this instance a flower box 4, the second curved surface 2 extends outward behind the mounted object 4 and curves upward and away from and then back towards the mounted object 4. As depicted in FIG. 2, two brackets FIG. 1 are affixed to the back wall of the mounted flower box 4. To ensure that the mounted object 4, i.e. flower box 4, is properly secured to the cross header 8 of a deck, railing or fence 5, lattice or other surface, it is important that the brackets FIG. 1 be evenly distributed on the back side (not shown) of the object 4 to be installed.

Figure 7:
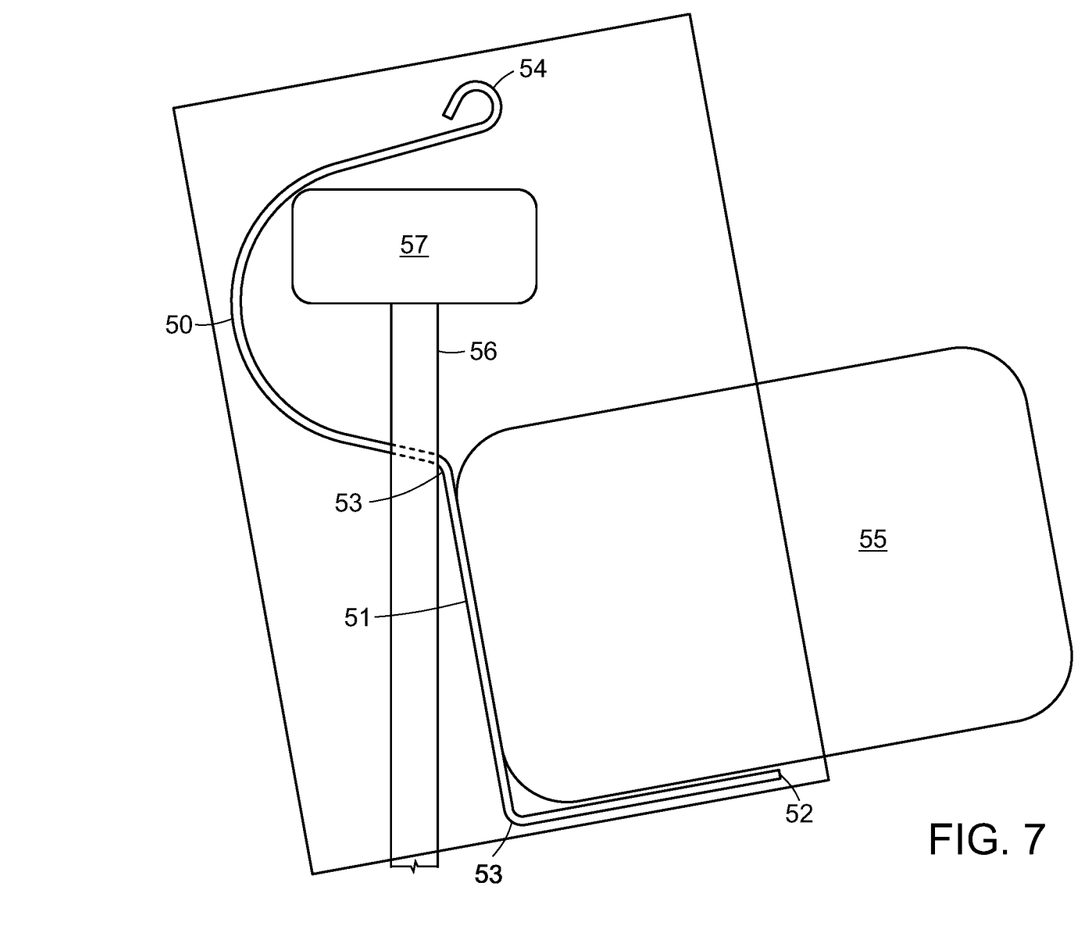
FIG. 7 is a cross-sectional view of the method to install a box, shelf, or structure to a railing or fence with supports at fixed intervals. The brackets are tilted and inserted through the open spaces between the supports, and then the assembly of brackets and box are rotated into the final installed location. The box, shelf, or structure is rotated to sit against the supports, and the curved section is rotated to determine the final position of vertical support against the header. This position will vary based on the geometry of the header.

Once the mounting bracket or brackets FIG. 1 is/are properly secured to the mounted object 4, the bracket(s) FIG. 1 are tilted and inserted through the open spaces 7 between the supports 6 of the fixture, such as the pickets of a fence FIG. 2, and then the assembly of brackets and box 5 are rotated into the final installed location, as depicted in FIG. 7. The box, shelf, or structure 4 is rotated to sit against the supports 6, and the curved section 2 is rotated to determine the final position of vertical support 1 against the header 8. This position will vary based on the geometry of the header 8. Once installed, the opposite side of the first surface of the bracket(s) 1 mated with the vertical surface of the mounted object 4 is/are flush with the vertical supports 6 of the fence, railing or deck and the curved section(s) 2 of the installed bracket(s) extend outward through the open spaces 7 of the fixture, such as the space between the vertical boards 6 or pickets of a traditional wooden fence 5, and upwards until the curved portion 2 of the bracket rests on the top of the header 8, such as the rail of a traditional wooden fence 5. The weight of the mounted object 4 subjects the bracket FIG. 1 to a downward force which in turn secures the curved portion 2 of the bracket FIG. 1 in place on the cross header 8 or rail of the fixture 5 the object 4, such as a flower box, is mounted on. The claimed bracket may further comprise additional means, such as a clip, to further secure the curved portion of the bracket to the header or rail of the fixture.

The unique design of the claimed mounting bracket provides opportunities in which to mount flower boxes and other decorative objects to residential/commercial/public fixtures that traditional flower boxes are incapable of being mounted upon without the use of additional hardware or difficult and potentially destructive installation techniques. The bracket of the instant invention may be used to mount a box, shelf, or structure to a plastic or composite railing, to a wrought iron fence with square-tube header, to a chain-link fence with a cylindrical header, to a metal railing with a cylindrical header, to a fabricated aluminum pool fence with a trapezoidal header or to lattice, either directly to the lattice FIG. 8 or around a rectangular plastic header to which the lattice is attached. In addition, a series of holes may be bored into retail signs and signage in such a configuration to allow the curved portion 2 of the bracket or brackets to be inserted into one set of holes, around the back surface of the sign or signage, and through a second set of holes wherein the curved portion 2 of the bracket FIG. 1 or bracket rest securing on the second set of holes, provided that the sign or signage is sturdy enough to support the weight of the mounted object 4.

Figure 3:
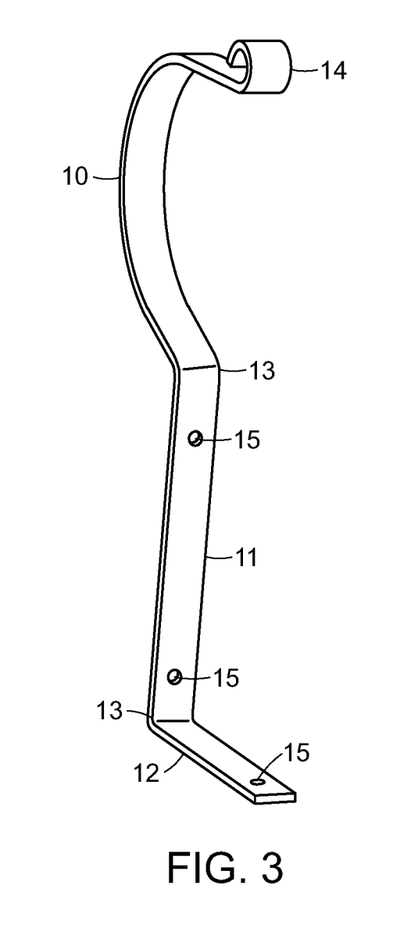
FIG. 3 is a three-dimensional view of the bracket with optional third mounting surface and aesthetic curl at end of second curved section, directly showing both mounting surfaces.

In an optional embodiment of the claimed invention, the mounting bracket further comprises a third surface, perpendicular to the first surface, for additional support of box, shelf, or railing as depicted in FIG. 3. This embodiment comprises a first flat surface 11 for mounting to a box, shelf, or structure, a second curved surface 10 for universal mounting to multiple configurations of railings, fences, or lattices, a third surface 12, perpendicular to the first surface 11, and elbows 13 connecting the curved surface 10 and perpendicular third surface 12 to the first surface 11. As shown in FIG. 3, the bracket may further comprise optional holes or bores 15 in either or both the first surface 11 and the perpendicular third surface 12 to secure the mounted object securely to the bracket. Further depicted in FIG. 3, is an optional tight curl 14 for aesthetics purposes. In some embodiments, such as when the bracket is used to secure an object, such as a flower box to a sign or signage, the tight curl 14 serves the purpose of preventing the curved surface 10 from sliding out of the hole in which it is situated.

Figure 4:
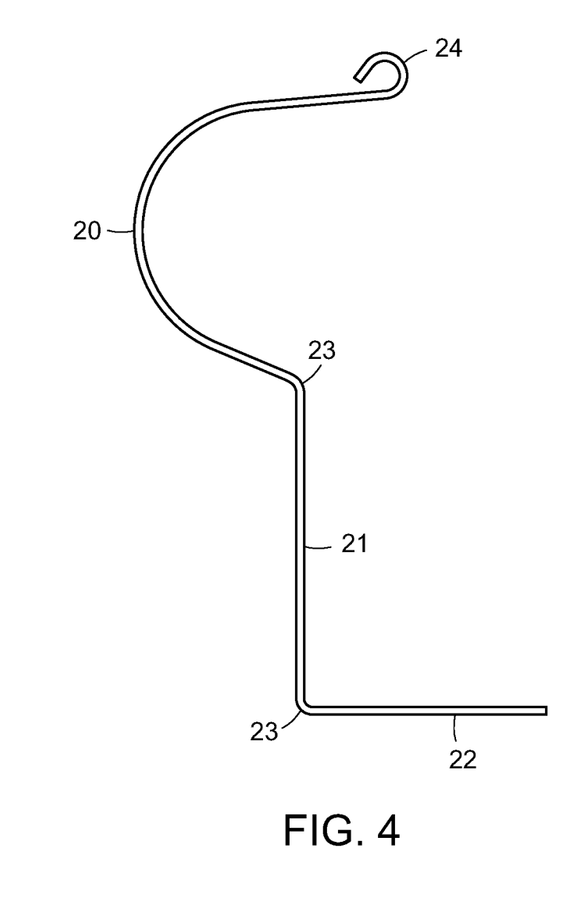
FIG. 4 shows the mounting bracket with an optional third mounting surface, for additional support of the box, shelf, or structure; and a tightly curled section at the end of the second curved section, for aesthetics and safety.

FIG. 4 is a side view of the bracket depicted in FIG. 3 showing the first flat surface 21 for mounting to a box, shelf, or structure, the second curved surface 20 for universal mounting to multiple configurations of railings, fences, or lattices, the third perpendicular surface 22, elbow joints 23 connecting the curved surface 20 and perpendicular third surface 22 to the first surface 21 and the optional decorative tight curl 14.

Figure 5:
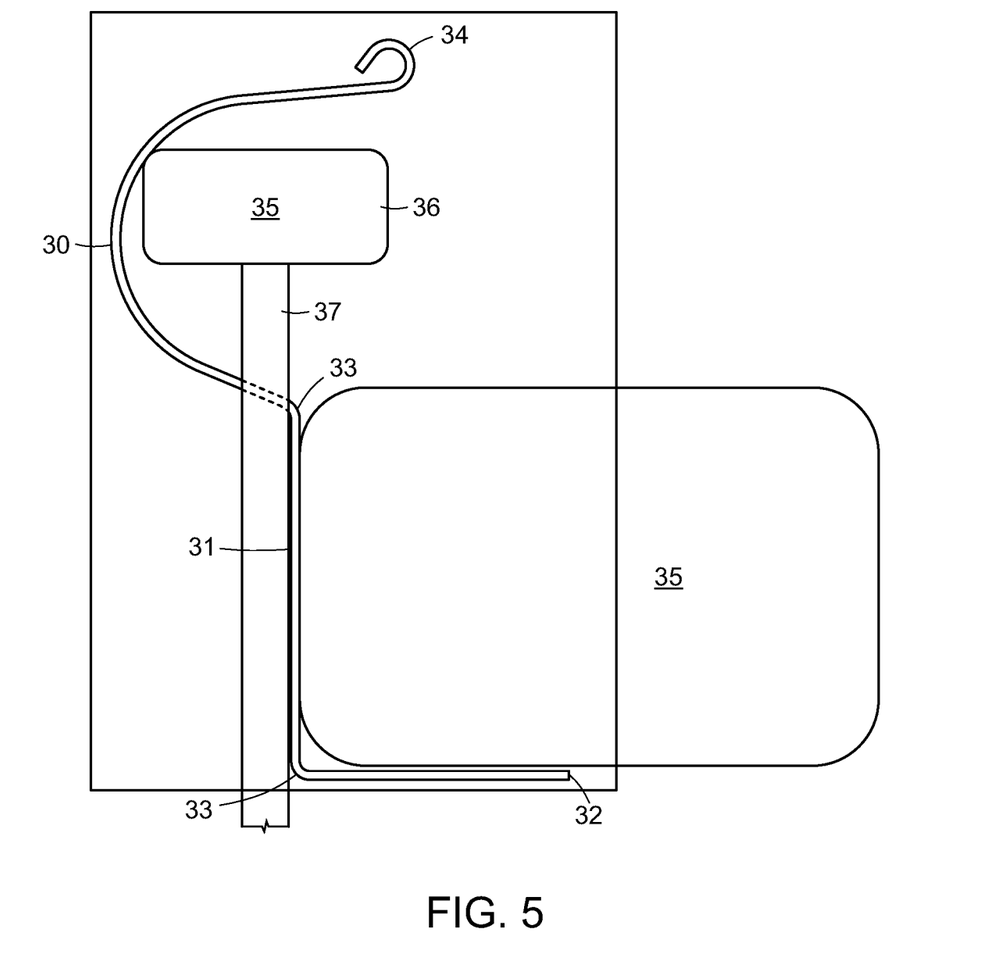
FIG. 5 is a cross-sectional view of the use of the bracket to mount a box, shelf, or structure to a wooden railing, wherein the first mounting surface is adjacent to the box, shelf, or structure, and the second mounting surface is in contact with the header.

FIG. 5 depicts the bracket as shown in FIG. 3 after it has been used to mount a flower box 35 to a wooden railing 37, wherein the first mounting surface 31 is adjacent to the box 35 and the second mounting surface 30 is in contact with the header 36 of the wooden railing 31. As depicted, the flower box 35 rests on the third, perpendicular mounting surface 32. Elbow joints 33 connecting the second mounting surface 30 and the third, perpendicular mounting surface 32 to the first mounting surface 31 are shown, as well as the optional, decorative tight curl 34.

Figure 6:
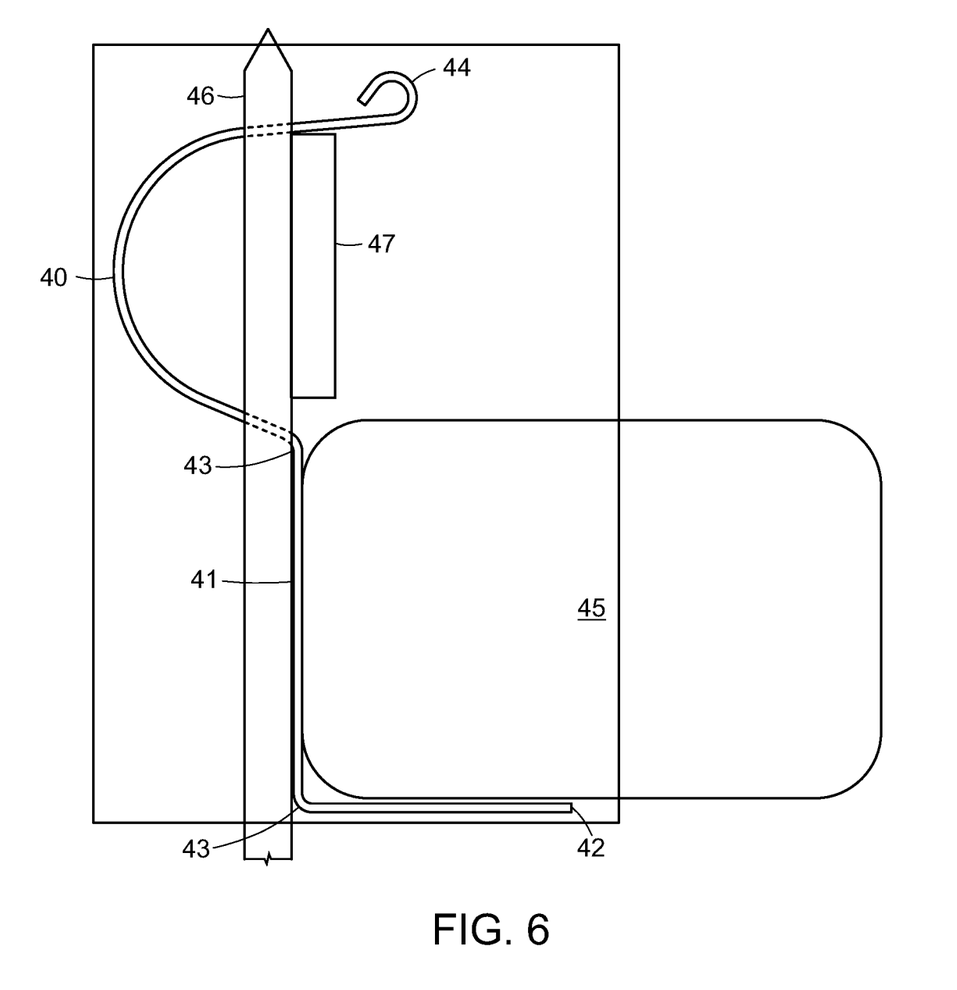
FIG. 6 is a cross-sectional view of the use of the bracket to mount a box, shelf, or structure to a plastic fence with a rectangular header, wherein the first mounting surface is adjacent to the box, shelf, or structure, and the second mounting surface is in contact with the header.

FIG. 6 is a cross-sectional view of the use of the bracket to mount a flower box 45 to a plastic fence 46 with a rectangular header 47, wherein the first mounting surface 41 is adjacent to the flower box 45 and the second mounting surface 40 is in contact with the header 47. As depicted, the flower box 45 rests on the third, perpendicular mounting surface 42. Elbow joints 43 connecting the second mounting surface 40 and the third, perpendicular mounting surface 42 to the first mounting surface 41 are shown, as well as the optional, decorative tight curl 44.

FIG. 7 depicts the installation "tipping" process. The second, curved mounting surface 50 is inserted through the open spaces (not shown) between the supports of a wooden railing or fence 56 by first tipping or positioning the flower box 55/bracket combination upwards, pushing the second mounting surface 50 through the aforementioned open spaces thereafter, and then pivoting the box/bracket combination downwards until the first mounting surface 51 is flush with the vertical supports 56 of the wooden railing 56 and the second, curved mounting surface 50 is in contact with the header 57 of the wooden railing 56. As depicted, the flower box 55 rests on the third, perpendicular mounting surface 52, elbow joints 53 join the three mounting surfaces and the decorative tight curl 54 is found at the end of the curved, second mounting surface 50.

Figure 8:
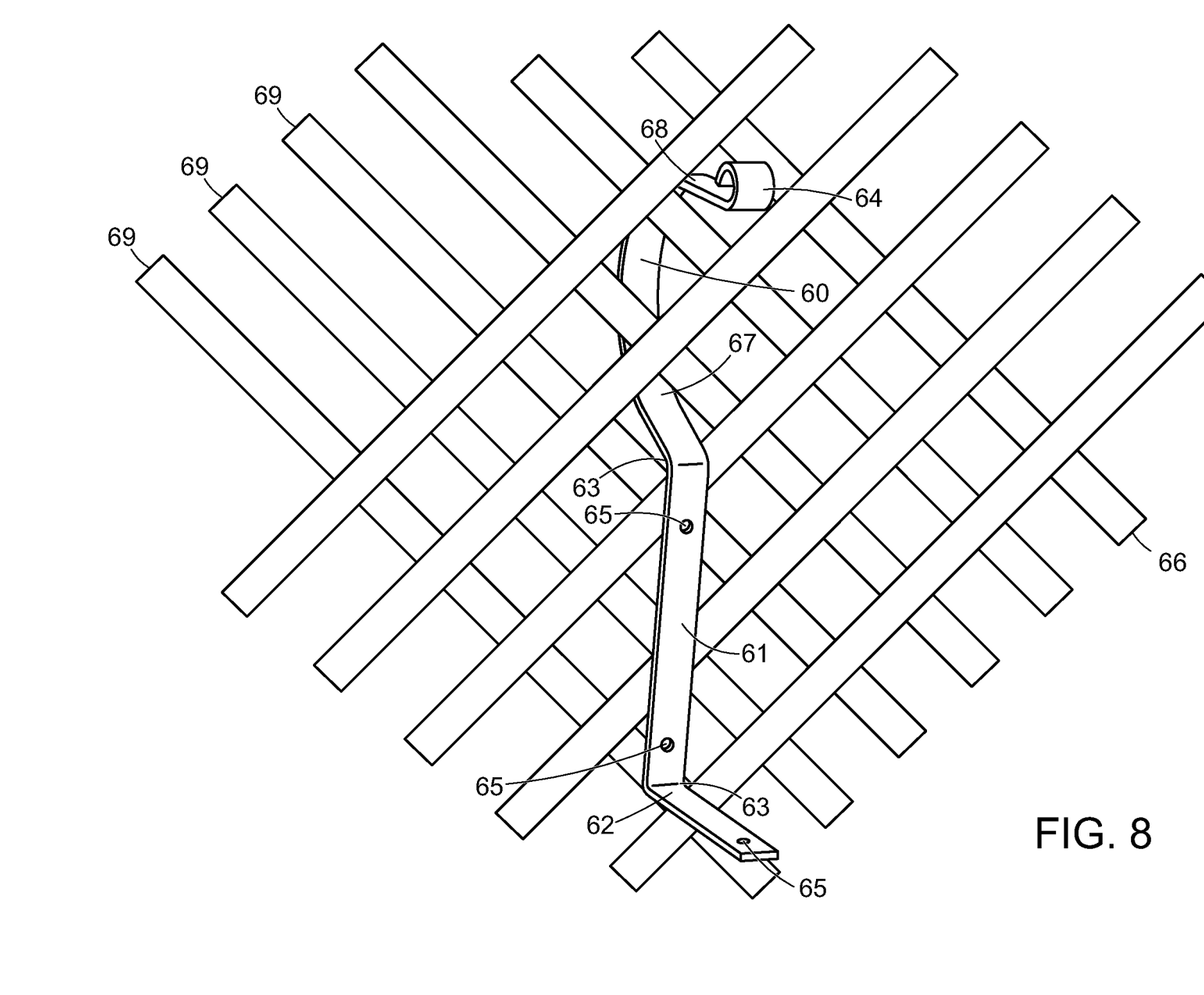
FIG. 8 is a cross-sectional view of the use of the bracket to mount a box, shelf, or structure through lattice, either directly to the lattice or around a rectangular plastic header, wherein the first mounting surface is adjacent to the box, shelf, or structure, and the second mounting surface is in contact with the lattice or header.

FIG. 8 depicts the installation of the claimed mounting bracket on lattice 66. The vertical, first mounting surface 61 is flush against the front surface of the lattice 66. The second, curved mounting surface 60 has been inserted through a space 67 created by the slats 69 of the lattice 66, outward to the back side (not shown) of the lattice 66, and back through a second space 68 created by a second set of slats 69 wherein said second space 68 is at a higher position in the lattice 66 than the first space 67. The top portion of the second, curved mounting surface 60 as well as the decorative tight curl 64 extend outward from the front surface of the lattice 66. The third, perpendicular mounting surface 62, the elbow joints 63 connecting three mounting surfaces and the optional securing holes 65 are shown.

Figure 9A:
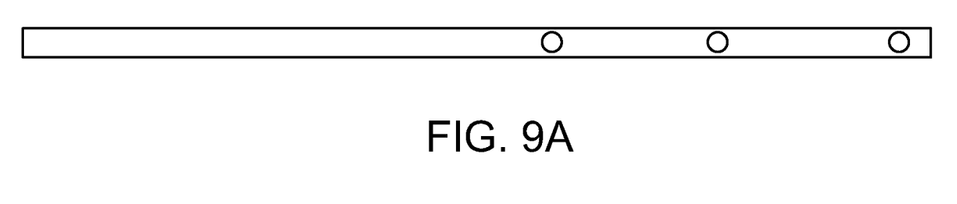
FIG. 9 is a CAD of the claimed flower box installation device.
Figure 9B:
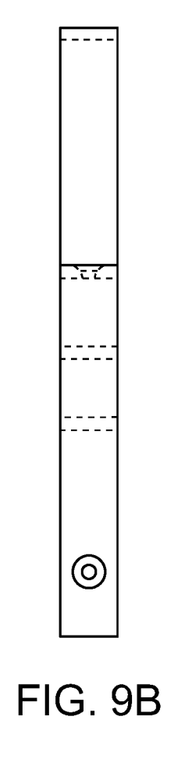
Figure 9C:
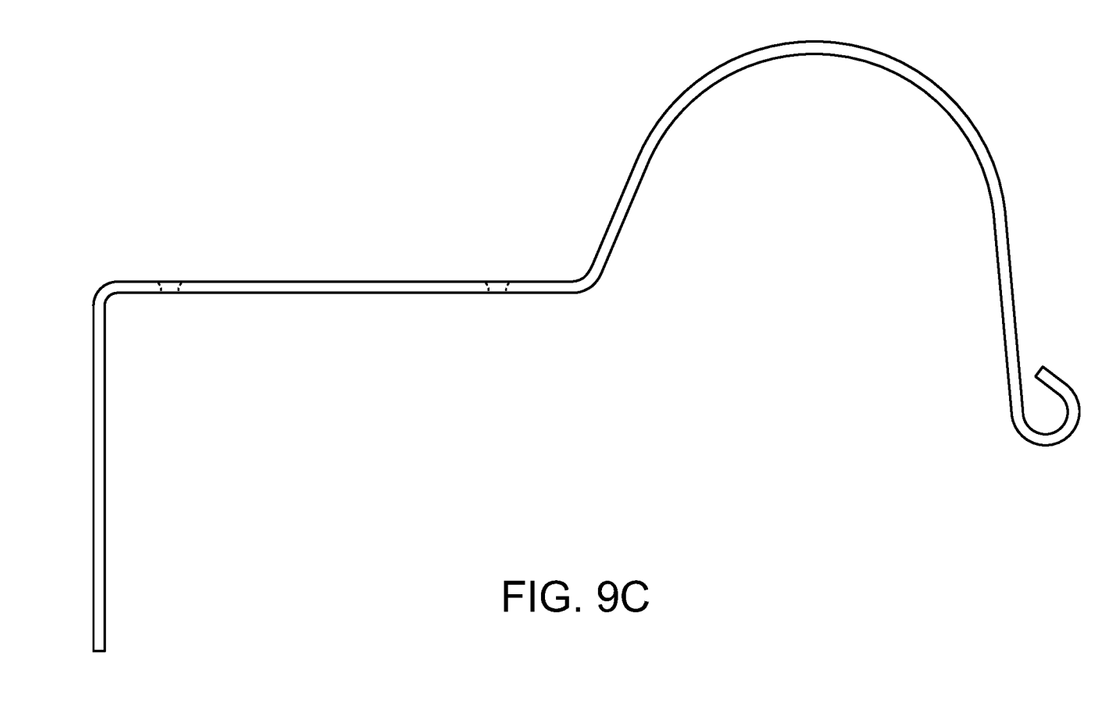

FIG. 9 is a computer-assisted drawing ("CAD") depicting the dimensions for the preferred embodiment of the claimed invention.

The claimed invention may be comprised of any materials capable of providing the support needed to secure a common flower box, or other decorative objects, to a fence, railing or lattice. Preferably, the claimed bracket is constructed using metal (most preferred), plastic, or composite materials such as metal composites or reinforced plastics, such as fiber-reinforced polymer. When constructed from metal-based materials, steel alloys, stainless steel alloys, aluminum alloys, or copper alloys, with strength suitable to support a box, shelf, or structure, and its content are preferred. The bracket may also be constructed from a low to intermediate carbon steel, tempered by heat treatment or cold reduction or from a low-carbon, high-strength-low-alloy (HSLA) steel, with yield strength exceeding 50 Ksi. Optionally, the bracket may be coated with a material for corrosion resistance, including by painting, powder coat, e-coat, clear coat, or patina. It may also be painted for aesthetic purposes.

In another embodiment, it is possible to produce a pre-formed assembly of the claimed bracket or brackets together with a decorative object, such as traditional flower box, preferably, a one-piece molded assembly of the claimed brackets and a plastic flower box.

The instant application also includes kits comprising the universal mounting bracket according to claim 1, means in which to secure an object to said universal mounting bracket and means to protect the surface upon which the bracket engages. Further, said means in which to secure an object to said universal mounting bracket includes nails, screws, bolts or the like and said protection means is a rubber pad or some similar object which prevents the claimed device from scratching or gouging the surface of the fixture upon which it is installed.

It is known to those skilled in the art that the bracket can be utilized to mount various structures, including, but not limited to: flower boxes; shelf (with vertical backing for mounting purposes); birdhouse; pig feeder; reel or spool for winding garden hose; wrought-iron or other metal flower basket; wooden signs; and a fabricated metal hoop for holding flower pot. It is understood that the mounting bracket is for universal installation to railings, fences, or lattices, and any desired geometry can be mounted to the railing as applicable. It is also known to those skilled in the art that the bracket can be utilized on fences, railings, or lattice with supports at fixed intervals, including, but not limited to: wooden railings, wooden fences, plastic railings, plastic fences, composite railings, composite fences, metal fences, metal railings, chain-link fences, fabricated aluminum fences, wooden lattice, plastic lattice, and metal lattice.

What is claimed is:

1. A universal mounting bracket comprising a first vertical, flat section and a second C-shaped, curved section attached to the first vertical, flat section;
    wherein said universal mounting bracket is used for mounting a flower box, shelf or structure to a wrought iron or chain-liked fence or a lattice without the use of nails, screws or other fastening hardware;
    wherein the first, vertical flat section contains one or more holes in which to attach the bracket to the flower box, shelf or structure;
    wherein the second C-shaped, curved section is designed to engage with the wrought iron fence or the chain-linked fence or the lattice when the mounting bracket is installed onto the wrought iron fence or the chain-linked fence or the lattice and the first vertical, flat section is used to attach the flower box, shelf or structure to the mounting bracket;
    wherein when the flower box, shelf or structure is secured to the first vertical, flat section, the second C-shaped, curved section is installed around the back of the wrought iron fence or the chain-linked fence or the lattice and over the top surface of the wrought iron fence or the chain-linked fence or the lattice so that the weight of the wrought iron fence or the chain-linked fence or the lattice causes the second C-shaped, curved section to exert a downward pressure on the wrought iron fence or the chain-linked fence or the lattice which such force as to retain the bracket and the flower box, shelf or structure to the chain-linked fence or the lattice.

2. The universal mounting bracket according to claim 1, further comprising a third horizontal, flat section that is attached perpendicularly to the end of the first vertical, flat section that is opposite the end of the first vertical, flat section that is attached to the second C-shaped, curved section; wherein said third horizontal, flat section provides additional support of box, shelf, or structure.

3. The universal mounting bracket according to claim 2, further comprising elbow joints connecting the second C-shaped, curved section and the third horizontal, flat section to the first vertical, flat section.

4. The universal mounting bracket according to claim 1, further comprising a tight curl at the end of said second C-shaped, curved section.

5. The universal mounting bracket according to claim 1, wherein said universal mounting bracket is constructed from materials selected from the group consisting of metal, plastic, composite materials and any combinations thereof.

6. The universal mounting bracket according to claim 5, wherein said metal is selected from the group consisting of steel alloys, stainless steel alloys, aluminum alloys, copper alloys and any combinations thereof, provided said alloys have sufficient strength suitable to support a box, shelf, or structure, and its contents.

7. The universal mounting bracket according to claim 5, wherein said metal is low to intermediate carbon steel, tempered by heat treatment or cold reduction.

8. The universal mounting bracket according to claim 1, wherein said universal mounting bracket is constructed from a low-carbon, high-strength-low-alloy (HSLA) steel, with yield strength exceeding 50 Ksi.

9. The universal mounting bracket according to claim 1, wherein said universal mounting bracket is coated for corrosion resistance.

10. The universal mounting bracket according to claim 9, wherein said coating is selected from the group consisting of painting, powder coating, e-coating, clear coating and a patina coating.

11. The universal mounting bracket according to claim 1, wherein said universal mounting bracket is capable of mounting a wooden or metal box, shelf or decorative item with supports at fixed intervals to various building/residential fixtures wherein said fixtures are selected from the group consisting of wooden railings, wooden fences, plastic railings, plastic fences, composite railings, composite fences, metal fences, metal railings, chain-link fences, fabricated aluminum fences, wooden lattice, plastic lattice and metal lattice.

12. The universal mounting bracket according to claim 1, wherein said universal mounting bracket is capable of mounting various decorative or functional items to various building fixtures, wherein said decorative or functional items are selected from the group consisting of flower boxes, shelves with vertical backing, birdhouses, pig feeders, reels or spools for winding garden hoses, wrought-iron or other metal flower baskets, wooden signs and fabricated metal hoops for holding flower pots.

13. The universal mounting bracket according to claim 12, wherein said various building fixtures wherein said fixtures are selected from the group consisting of wooden railings, wooden fences, plastic railings, plastic fences, composite railings, composite fences, metal fences, metal railings, chain-link fences, fabricated aluminum fences, wooden lattice, plastic lattice and metal lattice.

14. The universal mounting bracket according to claim 1, wherein said mounting bracket provides for the mounting of an object to the header of a railing or fence and for the removal of the universal mounting bracket and said object affixed to the universal mounting bracket once mounted to the header of a railing or fence without the use of tools or other mounting apparatuses.

15. A kit comprising the universal mounting bracket according to claim 1, further comprising means in which to secure an object to said universal mounting bracket and means to protect the surface of said object which the bracket engages.

16. The kit according to claim 15, wherein said means in which to secure the object to the universal mounting bracket is selected from the group consisting of nails, screws, bolts, rods, staples, hook and eyes, rivets, anchors and combinations thereof and said protection means is a rubber pad.

17. A pre-formed assembly of one or more universal mounting brackets according to claim 1 together with a decorative or useful object.

18. The pre-formed assembly according to claim 17, wherein said decorative or useful object is a flower box.

19. The universal mounting bracket according to claim 1, wherein said universal mounting bracket is mounted to a header of a wooden railing or wooden fence without damaging said railing or wooden fence.

20. The universal mounting bracket according to claim 1, further comprising a curlicue situated at the end of the C-shaped curved section not attached to the end of the second vertical flat section.

* * * * *